April 5, 1960 S. N. EINHORN ET AL 2,932,011

MATRIX SELECTION APPARATUS

Filed Jan. 15, 1957 2 Sheets-Sheet 1

INVENTORS
SIDNEY N. EINHORN
GEORGE G. HOBERG
JOHN O. PAIVINEN
RICHARD C. WEISE

BY Arthur W. Collins

ATTORNEY

MATRIX SELECTION APPARATUS

Filed Jan. 15, 1957

2 Sheets-Sheet 2

INVENTORS
SIDNEY N. EINHORN
GEORGE G. HOBERG
JOHN O. PAIVINEN
RICHARD C. WEISE

BY Arthur A. Collins

ATTORNEY 2,932,011

MATRIX SELECTION APPARATUS

Sidney N. Einhorn, Philadelphia, and George G. Hoberg, Berwyn, Pa., John O. Paivinen, Menlo Park, Calif., and Richard C. Weise, Philadelphia, Pa., assignors to Burroughs Corporation, Detroit, Mich., a corporation of Michigan Application January 15, 1957, Serial No. 634,293

7 Claims. (Cl. 340—174)

Figures 1, 2B:
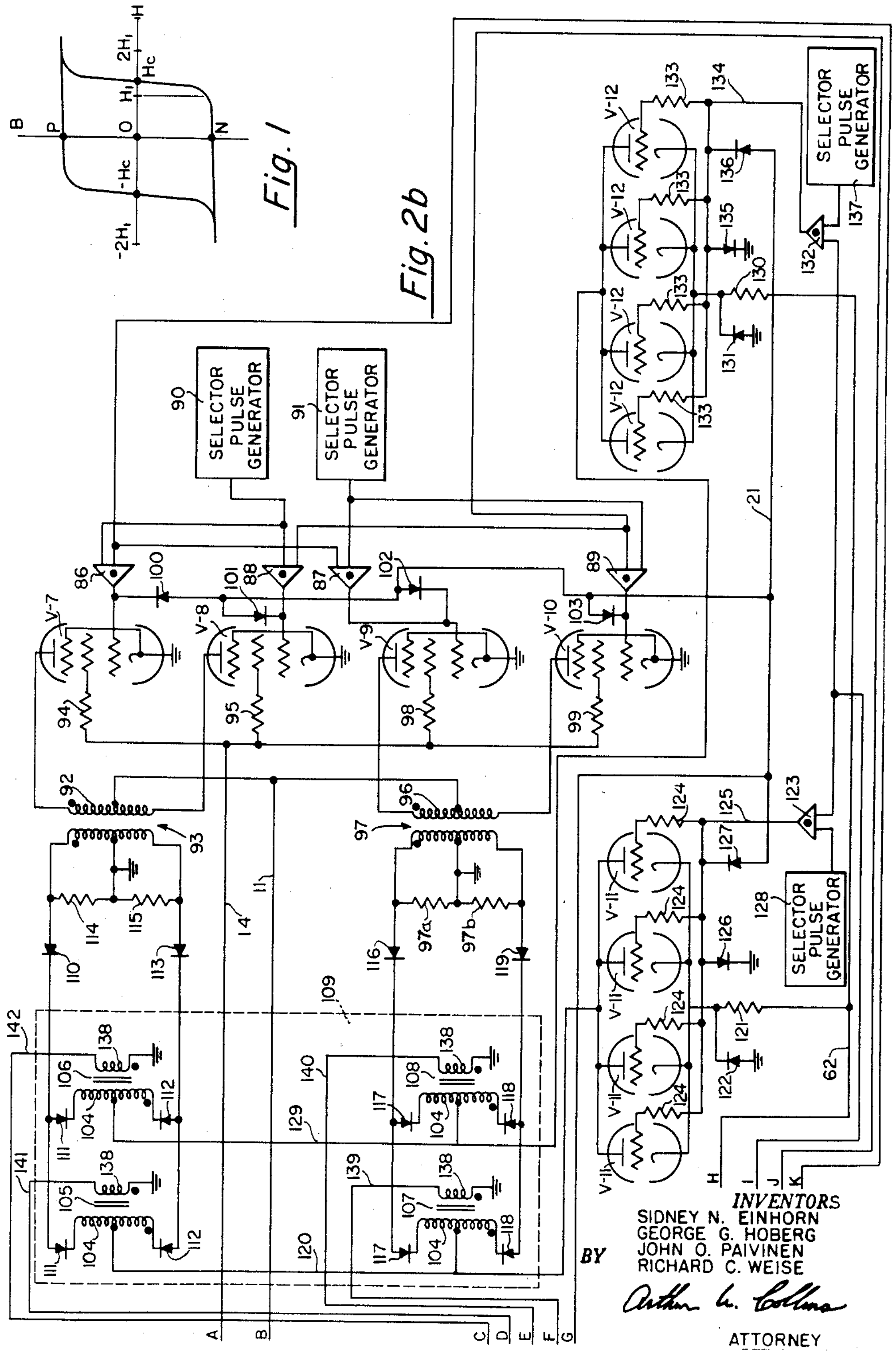

The present invention relates to static magnetic memory systems and more particularly to novel and improved selective switching apparatus which is required in the operation of a magnetic matrix memory device. This invention is related to that disclosed and claimed in Hoberg, S.N. 315,892, filed October 15, 1952, for "Matrix System," and assigned to the same assignee. The present circuit is more suited for operation with the arrangement of apparatus shown in this application.

Utilization of the bistable characteristic of a suitable magnetic core material for the storage of binary information is well known in the art. Thus, by control of the flow of a flux producing energizing current through a suitable winding which is coupled to the magnetic core, control of the remanent polarity of the core may be obtained and an indication of the storage therein of a binary "0" or a binary "1" may be provided. In order to reduce the complexity of the core switching equipment required for control of the remanent state of a plurality of magnetic cores of a memory device, it has become common practice to arrange the cores of the memory in regular rows and columns of a coordinate array or matrix, and to utilize the coincidence of a pair or more of partial energizing currents to produce sufficient magnetomotive force for a reversal of polarity. Additional matrix arrays of magnetic switch cores are also conventionally used to still further reduce the equipment required for the core switching operation. Although such coincidence current matrix core energizing systems have substantially diminished the complexity of memory switching equipment, considerable difficulty has been experienced with the same in confining the amplitude requirements of the various component coincident currents within suitable limits such that a selected matrix core will saturate and switch polarity properly only upon coincidence of the energization of the proper combination and number of individual energizing current circuits.

Accordingly, it is a principal object of the present invention to provide novel and improved apparatus for the selective energization of the various individual cores of a magnetic matrix.

It is a further object of the present invention to provide novel and improved apparatus for selecting individual cores of a magnetic memory matrix wherein transformer matrices are employed to reduce the quantity and required current ratings of the various circuit components thereof.

It is a still further object of the present invention to provide novel and improved apparatus for controlling energization of the cores of a magnetic matrix in a magnetic memory system wherein variations in the amplitude of the core energizing currents are effectively reduced.

Another object of the present invention is to provide novel and improved apparatus for controlling energization of the windings of a transformer control matrix wherein variations in the amplitude of the various transformer energizing currents are effectively reduced.

Other objects and many of the attendant advantages of this invention will be readily appreciated as the same becomes better understood by reference to the following detailed description which is considered in connection with the accompanying drawings wherein:

Figure 1 is a typical B–H hysteresis curve of a suitable magnetic core material used in the present invention.

Figure 2A:
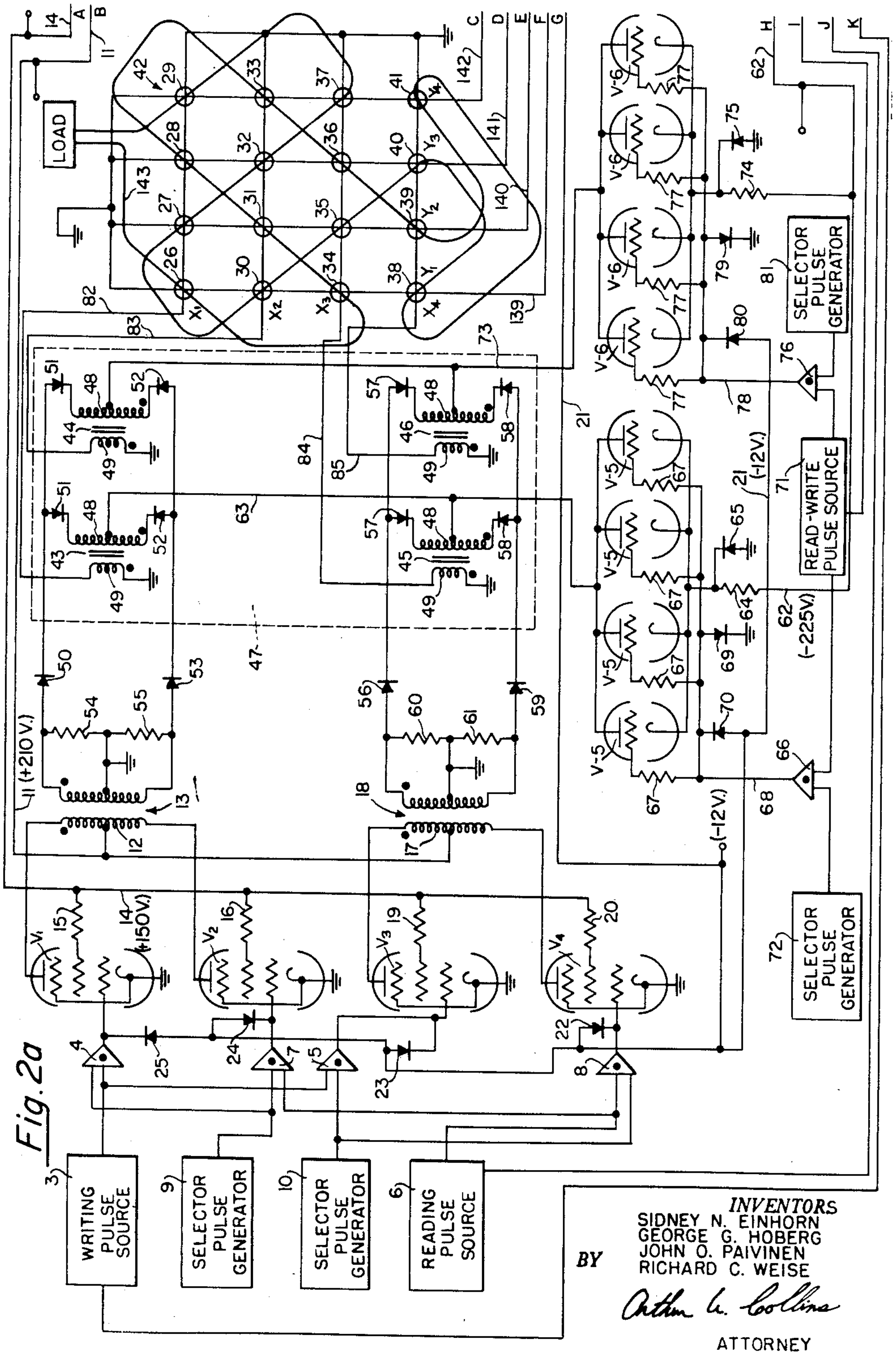

Figures 2*a* and 2*b* are, when placed side by side, a detailed schematic view of a preferred embodiment of the present invention.

Before describing in detail a preferred embodiment of the present invention, characteristic properties of the rectangular hysteresis material out of which the cores of a suitable static magnetic memory and switching matrix should be constructed will be described. The B–H curve of a magnetic core material suitable for the purposes of the present invention and its relatively rectangular properties are shown in Figure 1 of the drawing. The points P and N on the curve represent the remanent magnetic states of the core material after the magnetomotive force developed by current flow of sufficient magnitude in exciting windings in one direction or the other has been removed. Thus, for example, the point P represents the state of the core material after current of sufficient magnitude is applied through energizing windings to develop flux through the core in a positive direction and is then removed. Point N represents the negative remanent state of the core after a flux in the opposite direction is developed and removed. When the core occupies its negative remanent state at N, an applied magnetizing force $H_1$, no matter how often applied and removed, will not materially affect its remanent condition. A magnetizing force of $2H_1$, however, will cause the core to switch from N to P and bring about a complete reversal of flux in the core. Similarly, only a force greater than $-H_c$, produced by a current flowing through energizing windings in the opposite direction will return the core from the state P to the state N.

Materials having substantially rectangular hysteresis loops have been used heretofore to store electrical information. In such applications as in the present invention the disposition of the core at states P and N is said to correspond to the storage of binary digits "0" and "1" (or "1" and "0"). A digit is placed or read into the core by passing a current of intensity sufficiently greater than $H_c$ in the proper direction through its energizing cell. To read out information stored in a given core a current sufficiently greater than $H_c$ is again applied to the energizing coil in a predetermined positive or negative direction. If the reading force is positive and the core was already at state P, there is little change in flux intensity within the core and only a relatively small voltage is induced in the output circuit. If, however, the core was at state N when the positive reading force is applied, the core switches to state P and a substantial voltage is induced in the output circuit. Thus, it is seen that by energizing a core with a pair of coincident currents, which separately produce an $H_1$ force and together produce a $2H_1$ force a core having a substantially rectangular hysteresis loop characteristic can be used to store binary information which can later be detected by applying a second $2H_1$ force of known polarity.

A preferred embodiment of the present invention is illustrated in Figure 2 of the drawing. As shown therein, the output circuit of the "write" pulse source 3 is electrically connected to each of the "and" circuits 4 and 5 and the output circuit of the readout pulse source 6 is connected to each of the "and" circuits 7 and 8. The transformer matrix row selector generator 9 is connected for energization of "and" circuits 4 and 7 and the transformer matrix row selector source 10 is connected for energization of "and" circuits 5 and 8. The output circuits of "and" circuits 4, 5, 7 and 8 are respectively coupled to the control grids of tubes $V_1$, $V_3$, $V_2$ and $V_4$.

The plate circuit of the pentode $V_1$ extends from the positive 210 volt supply line 11 through the upper half of the split primary winding 12 of linear transformer 13 through the tube to ground. As will be more apparent hereinafter transformer 13 is selected to provide a suitable impedance match between the plate circuits of pentodes $V_1$ and $V_2$ and the output circuits coupled to its secondary winding. The suppressor grid of pentode $V_1$ is tied to its cathode and its screen grid is connected as shown to the positive 150 volt supply line 14 through resistor 15. The plate circuit of pentode $V_2$ extends from the positive 210 volt supply line 11 through the lower half of the split primary winding 12 of transformer 13 through the tube to ground. The suppressor grid of tube $V_2$ is tied to its cathode and its screen grid is connected as shown to the positive 150 volt supply line 14 through resistor 16. Plate circuit of pentode $V_3$ extends from the positive 210 volt supply line 11 through the upper half of the split primary winding 17 of linear matching transformer 18 through the tube to ground. The suppressor grid of tube $V_3$ is tied to its cathode and its screen grid is connected to the positive 150 volt supply line 14 through resistor 19. The plate circuit of pentode $V_4$ extends from the positive 210 volt supply line 11 through the lower half of the split primary winding 17 of transformer 18 through the tube to ground. The suppressor grid of tube $V_4$ is tied to its cathode and the screen grid is connected to the positive 150 volt supply line 14 through resistor 20. The control grids of tubes $V_1$, $V_2$, $V_3$ and $V_4$ are each preferably connected to negative 12 volt supply line 21 respectively through the diodes 25, 24, 23 and 22.

The transformer matrix 47, which for the sake of simplicity is shown herein as a mere 2 x 2 array rather than an array more commonly used in practice such as an 8 x 8, includes the linear transformers 43–46. Each of the transformers 43–46 has a split input winding 48 and an output winding 49, which are preferably iron core or ferrite core coupled but which could be air core coupled if the required number of component winding turns were provided. The input windings 48 of the several transformers in the upper row of matrix 47 are electrically coupled to the output of linear transformer 13 by a pair of circuits that extend from opposite extremities of the secondary winding of transformer 13 respectively through diodes 50 and 53, and through the several diodes 51 and 52 to windings 48. Damping resistors 54 and 55 preferably couple opposite extremities of the secondary winding of transformer 13 to its center tapped ground terminal as shown. As will be more apparent hereinafter the split secondary winding of transformer 13 and the split primary windings of transformers 43 and 44 allows establishment of current flow in the output windings 49 in either direction. Thus, when pentode $V_1$ is pulsed and triode V–5 or V–6 is conditioned to accept the flow of plate current, current flows through diodes 50 and 51 and windings 48 and 49 in one direction whereas when pentode $V_2$ is pulsed under the same conditions current flows through diodes 52 and 53 and windings 48 and 49 in the opposite direction. Input windings 48 of the several transformers in the lower row of matrix 47 are electrically coupled to the output of transformer 18 by a pair of circuits that extend from opposite extremities of its secondary winding respectively through diodes 56 and 59 and through the several diodes 57 and 58 to windings 48 of transformers 45 and 46. Damping resistors 60 and 61 preferably couple opposite extremities of the secondary winding of transformer 18 to its center tapped grounded terminal as shown. The split secondary of transformer 18 and the split primary windings of transformers 45 and 46 allow establishment of current flow in their output windings 49 in either direction depending upon selective energization of pentode $V_3$ or pentode $V_4$ in a manner which will also be more apparent hereinafter. The center tapped terminals of windings 48 of the left column of transformers of matrix 47 are connected to the negative 225 volt supply line 62 in a circuit that extends from each center tap through conductor 63, through the parallel connected triodes V–5 and through relatively large resistor 64 to supply line 62. The common connection between the cathodes of triodes V–5 is preferably clamped to ground as shown through diode 65 such that triodes V–5 can be cut off with a lower magnitude of negative grid voltage than would otherwise be required. The control grid of each of the triodes V–5 is connected to the "and" circuit 66 through a resistor 67 and conductor 68 which is clamped between ground and the negative 12 volt supply line 21 through diodes 69 and 70, the primary purpose of each resistor 67 being to suppress spurious oscillations in its respective triode grid circuit. "And" circuit 66 is connected for a simultaneous energization from the read-write source 71 and the matrix column selector source 72 in a manner which will be more apparent hereinafter.

The center tapped terminals of the several windings 48 in the right column of transformers of matrix 47 are also connected to the negative 225 volt supply line 62 in a circuit that extends from each center tap through conductor 73, through the parallel connected triodes V–6, and through the relatively large resistor 74 to the negative supply line 62. The common connection between the cathodes of triodes V–6 is preferably clamped to ground as shown through diode 75 such that cut off of the triodes V–6 may be caused by a lower grid potential. The control grid of each of the triodes V–6 is connected to the "and" circuit 76 through oscillatory damping resistor 77. "And" circuit 76 is connected for a simultaneous energization from the read-write source 71 and the matrix column selector source 81 in a manner which will also be more apparent hereinafter.

The saturable magnetic cores or elements 26–41 of the memory device 42 are preferably disposed in a plurality of lines of suitable rows and columns to form a two dimensional matrix array. Individual conductors link the magnetic memory elements of the several rows or lines of the matrix 42 and are electrically connected in individual memory row selector circuits which are energized by the various output windings 49 of transformer matrix 47. Thus, as shown in Figure 2 of the drawing the energizing circuit for cores 26, 27, 28 and 29 in row $X_1$ of matrix 42 extends from winding 49 of transformer 43 through conductor 82 and through the cores 26, 27, 28 and 29 back to winding 49. Cores in the various other $X_2$, $X_3$ and $X_4$ rows of matrix 42 are respectively energized by windings 49 of transformers 44, 45 and 46 of matrix 47 through similar circuits that include conductors 83, 84 and 85.

The circuits and circuitry which are used to energize the cores of the several columns or lines of memory matrix 42 are substantially similar to the above described energizing circuits for the cores of its several rows. Thus, the output circuit of the write pulse source 3 is also electrically connected to each of the "and" circuits 86 and 87, and the output circuit of the read pulse source 6 is electrically connected to each of the "and" circuits 88 and 89. Matrix column selector source 90 is connected to "and" circuits 86 and 88 and matrix column selector source 91 is connected to "and" circuits 87 and 89. The output circuits of "and" circuits 86, 87, 88 and 89 are respectively coupled to the control grids of pentodes V–7, V–9, V–8 and V–10. The plate circuit of pentode V–7 extends from the positive 210 volt supply line 11 through the upper half of the split primary winding 92 of linear matching transformer 93 through the tube to ground. The suppressor grid of tube V–7 is tied to its cathode and its screen grid is connected as shown to the positive 150 volt supply line 14 through resistor 94. The plate circuit of pentode V–8 extends from the positive 210 volt supply line 11 through the lower half of the split primary winding 92 of transformer 93 through the tube to ground. The suppressor grid of tube V-8 is tied to its cathode and its screen grid is connected as shown to the positive 150 volt supply line 14 through resistor 95. The plate circuit of pentode V-9 extends from the positive 210 volt supply line 11 through the upper half of the split primary winding 96 of linear matching transformer 97 through the tube to ground. The suppressor grid of tube V-9 is tied to its cathode and its screen grid is connected to the positive 150 volt supply line 14 through resistor 98. The plate circuit of pentode V-10 extends from the positive 210 volt supply line 11 through the lower half of the split primary winding 96 of transformer 97 through the tube to ground. Suppressor grid of tube V-10 is tied to its cathode and its screen grid is connected to the positive 150 volt supply line 14 through resistor 99. Control grids of tubes V-7, V-8, V-9 and V-10 are each preferably connected to the negative 12 volt supply line 21 respectively through diodes 100, 101, 102 and 103.

The transformer matrix 109, which is also shown herein as a mere 2 x 2 array for the sake of simplicity, includes the linear transformers 105-108. Each of the transformers 105-108 has a split input winding 104 and an output winding 138, which are preferably iron core or ferrite core coupled but which could be air core coupled if the required number of component winding turns were provided. The input windings 104 of the several transformers in the upper row of matrix 109 are electrically coupled to the output of linear transformer 93 by a pair of circuits that extend from opposite extremities of the secondary winding of transformer 93 respectively through diodes 110 and 113. Damping resistors 114 and 115 preferably couple opposite extremities of the secondary winding of transformer 93 to its center tapped ground terminal as shown. As will be more apparent hereinafter the split secondary winding of transformer 93 and the split primary windings of transformers 105 and 106 allow establishment of current flow in their output windings 138 in either direction depending upon selective energization of pentode V-7 or pentode V-8. Input windings 104 of the several transformers in the lower row of matrix 109 are electrically coupled to the output of transformer 97 by a pair of circuits that extend from opposite extremities of its secondary winding respectively through diodes 116 and 119 and through the several diodes 117 and 118 to windings 104 of transformers 107 and 108. Damping resistors **97*a* and 97*b* preferably couple opposite extremities of the secondary winding of transformer 97 to its center tapped grounded terminal as shown. The split secondary of transformer 97 and the split primary windings of transformers 107 and 108 allow establishment of current flow in their output windings 138 in either direction depending upon selective energization of pentode V-9 or pentode V-10 in a manner which will also be more apparent hereinafter. The center tapped terminals of windings 104 of the left column of transformers of matrix 109 are connected to the negative 225 volt supply line 62 in a circuit that extends from each center tap through conductor 120, through the parallel connected triodes V-11 and through relatively large resistor 121 to supply line 62. The common connection between the cathodes of triodes V-11 is preferably clamped to ground as shown through diode 122 such that triodes V-11 can be cut off with a lower magnitude of negative grid voltage that would otherwise be required. The control grid of each of the triodes V-11 is connected to the "and" circuit 123 through a resistor 124 and conductor 125 which is clamped between ground and the negative 12 volt supply line 21 through diodes 126 and 127, the primary purpose of each resistor 124 being to suppress spurious oscillations in its respective triode grid circuit. "And" circuit 123 is connected for a simultaneous energization from the read-write source 71 and the matrix column selector source 128** in a manner which will be more apparent hereinafter.

The center tapped terminals of the several windings 104 in the right column of transformers of matrix 109 are also connected to the negative 225 volt supply line 62 in a circuit that extends from each center tap through conductor 129, through the parallel connected triodes V-12, and through the relatively large resistor 130 to the negative supply line 62. The common connection between the cathodes of triodes V-12 is preferably clamped to ground as shown through diode 131 such that cut off of the triodes V-12 may be caused by a lower grid potential. The control grid of each of the triodes V-12 is connected to the "and" circuit 132 through an oscillation damping resistor 133. "And" circuit 132 is connected for a simultaneous energization from the read-write source 71 and the matrix column selector source 137 in a manner which will also be more apparent hereinafter.

Individual conductors link the magnetic elements 26-41 of the several columns of the memory matrix 42 and are electrically connected in individual memory column selector circuits which are energized by the several output windings 138 of switch matrix 109. Thus, as shown in Figure 2 of the drawing the energizing circuit for cores 26, 30, 34 and 38 in column $Y_1$ of matrix 42 extends from winding 138 of the switch matrix core 107 through conductor 139 and through the cores 38, 34, 30 and 26 back to winding 138. Cores in the various other columns $Y_2$, $Y_3$ and $Y_4$ of matrix 42 are respectively energized by windings 138 of cores 108, 105 and 106 of switch matrix 109 through similar circuits that include conductors 140, 141 and 142.

It will be noted above that transformers 13, 18, 93 and 97 are characterized in general as being linear. By this it is to be understood that each said transformer is generally capable of reproducing in its secondary winding a pulse having a waveform which is substantially the same as that which is impressed across its primary winding. Design of the various components of the primary and secondary circuits of the said transformers is also determined in any suitable conventional manner such that distortion of the input and output pulse waveforms across the said transformers is minimized. In this way as will be more apparent hereinafter when the potential of the control grid of any of the pentodes $V_1$ to $V_4$ or V-7 to V-10 is increased from cutoff to a point where a maximum plate current will flow therethrough, a substantially constant voltage energy source is provided for energization of the various transformer primary windings of matrices 47 and 109.

It might also be noted the resistors 15, 16, 19, 20, 94, 95, 98 and 99 in the screen circuits of pentodes $V_1$ to $V_4$ and V-7 to V-10 are provided primarily for the purpose of limiting the maximum flow of screen current. It was found that when the various circuit components which effect the flow of plate current through said pentodes are designed for minimum waveform distortion in the secondary of transformers 13, 18, 93 and 97, said resistors are necessary to avoid excessive screen current which oftentimes damages the screen grid element of a new pentode and diminishes its effective life.

In the operation of the above described apparatus when binary information is to be read from the memory matrix 42, the read source, the read-write source, and a predetermined combination of selector pulse sources for each transformer matrix are energized. Thus, if it is desired to interrogate core 26 of memory matrix 42, the simultaneous energization of the read source 6 and the selector source 9 together with the simultaneous energization of the read-write source 71 and the selector source 72 respectively feed positive pulses through "and" circuits 7 and 66 onto the control grids of tube $V_2$ and the parallel connected triodes V-5. Tube $V_2$, which is normally cut off and clamped at a negative 12 volt potential by diode 24, then conducts, producing a negative pulse at the lower terminal of the primary winding 12 of linear transformer 13. This induces a positive potential at the upper terminal of secondary winding of transformer 13 which causes current flow through the diode 50, the diode 51, the upper half of the split input winding 48 of transformer 43, through conductor 63, the parallel connected triodes V–5 which have also been energized by a positive pulse from "and" circuit 66, and through the relatively large cathode resistor 64 to the negative 225 volt line 62. No current flows through diode 53 because the polarity in the lower half of the secondary of transformer 13 is such to cause diode 53 to present its high back impedance to the applied voltage. Current flow through the input winding 48 of transformer 43 induces a positive reading potential voltage across the output winding 49 producing a current flow through conductor 82 which links cores 26, 27, 28 and 29 of column $X_1$ of the memory matrix. When "and" circuit 66 is not pulsed by both inputs from sources 71 and 72, triodes V–5 are of course not primed to accept the flow of plate current since their grid-cathode voltages are below that required to pass plate current. The cathode circuit resistor 64 returned to the well regulated negative supply line 62 results in degenerative action during simultaneous energization of "and" circuit 66 and transformer 13 which tends to provide a pulse current through the primary of transformer 43 of constant value as required.

In the meantime simultaneous energization of read source 6 and the selector source 91 together with the simultaneous energization of the read-write source 71 and selector source 128 respectively feed positive pulses through "and" circuits 89 and 123 onto the control grids of tube V–10 and the parallel connected triodes V–11. Tube V–10 then conducts producing a negative pulse at the lower terminal of the primary winding of linear transformer 97. This induces a positive potential at the upper terminal of secondary winding of transformer 97 which causes current flow through the diode 116, the diode 117, and the upper half of the split input winding 104 of transformer 107, through conductor 120, through the parallel connected triodes V–11, which have also been energized by a positive pulse from the "and" circuit 123, and through the relatively large cathode resistor 121 to the negative 225 volt line 62. No current flows through diode 119 because the polarity in the lower half of the secondary of transformer 97 is such to cause diode 119 to present its high back impedance to the applied voltage. Current flow through the input winding 104 of transformer 107 produces a positive reading potential across the output winding 138 and current flow through conductor 139 which links cores 38, 34, 30 and 26 of column $Y_1$ of the memory matrix. When "and" circuit 123 is not pulsed by both inputs from sources 71 and 128, triodes V–11 are of course not primed to accept the flow of plate current since their grid-cathode voltages are below that required to pass plate current. The cathode circuit resistor 121 returned to the well regulated negative supply line 62 results in degenerative action during simultaneous energization of "and" circuit 123 and transformer 97 which tends to provide a pulse current through the primary of transformer 107 of constant value as required. With the coincident flow of current through conductors 82 and 139 sufficient magnetomotive force is produced to switch core 26 to its "0" remanent state if a binary "1" were at the time stored therein, thereby inducing an output voltage in output winding 143 and indicating the presence of said binary "1." No appreciable voltage on the output circuit, however, would indicate that at the time of read-out or interrogation core 26 already occupied its "0" state.

When it is desired to write a "1" into core 26 of memory matrix 42, the simultaneous energization of the write source 3 and the selector source 9 together with the simultaneous energization of the read-write source 71 and selector source 72 respectively pass positive pulses through "and" circuits 4 and 66 on to the control grids of tube $V_1$, and the parallel connected triodes V–5. Tube $V_1$, which is normally cut off and clamped at a negative 12 volt potential by diode 25, then conducts, producing a negative pulse at its plate and at the upper terminal of the primary winding of linear transformer 13. This pulse produces a positive potential at the lower terminal of secondary winding of transformer 13 and current flow through the diode 53, the diode 52, the lower half of the split input winding 48 of transformer 43 in matrix 47, through conductor 63, the parallel connected triodes V–5, which have also been primed to conduct current by a positive pulse from "and" circuit 66, and through the relatively large cathode resistor 64 to the negative 225 volt supply line 62. No current flows through diode 50 because the polarity in the upper half of the secondary of transformer 13 is such as to cause diode 50 to present its high back impedance to the applied voltage. Current flow through the input winding of transformer 43 then produces a negative potential across the transformer output winding 49 and current flow through conductor 82 which links cores 26, 27, 28 and 29 of row $X_1$ of the memory matrix. When "and" circuit 66 is not pulsed by both inputs from sources 71 and 72, triodes V–5 are of course not primed to accept the flow of plate current since their grid-cathode voltages are below that required to pass plate current. The cathode circuit resistor 64 returned to the well regulated negative supply line 62 results in degenerative action during simultaneous energization of "and" circuit 66 and transformer 13 which tends to provide a pulse current through the primary of transformer 43 of constant value as required.

In the meantime simultaneous energization of the write source 3 and the selector source 91 together with the simultaneous energization of the read-write source 71 and the selector source 128 respectively feed positive pulses through "and" circuits 87 and 123 onto the control grids of tube V–9 and the parallel connected triodes V–11. Tube V–9 then conducts producing a negative pulse at the upper terminal of the primary winding of linear transformer 97. This induces a positive potential at the lower terminal of secondary winding of transformer 97, which causes current flow throuh the diode 119, the diode 118, the lower half of the split input winding 104 of transformer 107, through conductor 120, the parallel connected triodes V–11 which have also been energized by a positive pulse from "and" circuit 123, and through the relatively large cathode resistor 121 to the negative 225 volt line 62. No current flows through diode 116 since the polarity in the upper half of the secondary of transformer 97 is such as to cause diode 116 to present its high back impedance to the applied voltage. Current flow through the input winding 104 of transformer 107 induces a negative voltage across the transformer output winding 138 producing a current flow through conductor 139 which links cores 38, 34, 30 and 26 of column $Y_1$ of the memory matrix.

As in conventional coincident current systems with the coincident flow of current through conductors 82 and 139 a sufficient magnetomotive force is produced to switch core 26 from an original N or "0" state to its P or "1" remanent state thereby storing the desired binary 1 in the core.

During each read out operation the selected core of the memory matrix 42 is returned to its original "0" state. Thus, in order to write a "0" in any one given core of matrix 42, the circuits capable of switching said core from its "0" to its "1" said state are merely rendered ineffective. For the sake of simplicity of the description of the present invention it may be assumed that this is accomplished by purposely not energizing the writing source 3 such that the transformer energizing circuits associated with the core into which the "0" is to be written are not completed. It might be noted, however, that in actual practice in writing the binary "0" in a given core the writing source 3 and the read-write source 71 are preferably both energized to close the energizing circuits of selected transformers but an inhibiting circuit which simultaneously develops a counter flux in the core is also provided and the core remains in its "0" state. This procedure is ordinarily followed so as to maintain operation of the various circuit transformers along predetermined desired portions of their saturation curves.

Binary information may be stored in and/or read out of any other core or group of cores of the memory matrix in a manner similar to that described above by energizing a different unique combination of the row and column selector sources 9, 10, 72, 81, 90, 91, 128 and 137.

Although a mere two dimensional matrix of memory cores is disclosed in the above described embodiment of the present invention, it is to be understood that a plurality of such two dimensional matrices of cores could be arranged in a third dimension and that selection of any one such matrix could be obtained by energizing all but the selected matrix with a suitable inhibiting current in a conventional manner without departing from the spirit or scope of the present invention.

It is to be noted that in the above described apparatus no transformer of either switch matrix 47 or 109 is energized either partially or otherwise until a predetermined combination of the switch matrix row and column sources 9, 10, 72, 81, 90, 91, 128 and 137 are energized. Moreover, when the selected transformer in the matrix is energized, it is to be noted that no other transformer within the matrix is even partially energized. Thus, noise output signals from the unselected transformers of the matrix are eliminated. Although this arrangement for transformer energization is shown herein only in connection with the memory control matrix energizing circuits, it is to be understood that a similar arrangement for the energization of the cores of the memory matrix itself could also be provided without departing from the spirit or scope of the present invention.

Obviously many modifications and variations of the present invention are possible in the light of the above teachings. It is therefore to be understood that within the scope of the appended claims the invention may be practiced otherwise than as specifically described herein.

We claim:

1. A magnetic memory comprising in combination a matrix of magnetic cores having a plurality of windings thereon and electrically arranged in rows and columns; a first matrix of transformers, a winding of the cores of the several individual rows of said core matrix being inductively coupled to individual transformers of said first transformer matrix; a second matrix of transformers, a winding of the cores of the several columns of said core matrix being inductively coupled to individual transformers of said second transformer matrix; and means for selectively energizing any of the transformers of either of said transformer matrices, said means including a source of electrical energy, individual circuits electrically coupled to each transformer of said matrices of transformers, a thermionic discharge device for each said individual circuit and coupled to said source of electrical energy, linear transformers coupled between said thermionic discharge device and said individual circuits, and means for coupling the energy source to each said circuit respectively through the thermionic discharge device and the linear transformer associated therewith to select a core in said matrix of magnetic cores.

2. A magnetic memory comprising in combination a matrix of magnetic cores having a plurality of windings thereon and electrically arranged in rows and columns; a first matrix of transformers, a winding of the cores of the several individual rows of said core matrix being inductively coupled to individual transformers of said first transformer matrix; a second matrix of transformers, a winding of the cores of the several columns of said core matrix being inductively coupled to individual transformers of said second transformer matrix; linear transformers individually coupled to said first matrix and said second matrix of transformers, a source of power coupled to said linear transformers and means to read a magnetic core of said matrix of magnetic cores through actuation of said power source.

3. Switching apparatus for cores of a magnetic memory device, said apparatus comprising a matrix of transformers electrically arranged in a plurality of rows and columns; a source of electrical energy; linear transformers coupled to said source of electrical energy; an individual circuit for each of the several rows of the matrix, each of the transformers in a row of the matrix being coupled to the circuit individual to said row and to one of said linear transformers, each of said circuits including a normally de-energized electron tube; an individual circuit for each of the several columns of the matrix, each of the transformers in a column of the matrix being coupled to the circuit individual to said column and to another of said linear transformers, each of said circuits including a normally de-energized electron tube; and means for selectively energizing a normally de-energized electron tube of an individual row circuit and a normally de-energized electron tube of an individual column circuit to complete an energization circuit for a predetermined core of the matrix.

4. In a magnetic matrix memory system, means for switching the polarity of a plurality of magnetic cores electrically arranged in a plurality of lines of rows and columns, said means comprising for each pair of rows and for each pair of columns a pair of thermionic discharge devices, said discharge devices of said pair each having at least a cathode, an anode, and a control grid, control circuits in circuit with said control grids, a center tapped linear transformer having one end of its primary winding coupled to the anode of one of said discharge devices of said pair and the other end of its primary winding coupled to the anode of the other said discharge device of said pair, a source of power coupled to said primary winding at its center tap, a pair of core transformers having a secondary winding and a center tapped primary winding, said primary windings being in parallel relationship with the secondary winding of said linear transformer, a connection from said secondary winding of one of said core transformers to all the cores of a line of matrix of cores, a connection from said secondary winding of the other of said core transformers to all the cores of another line of the matrix of course, a first normally de-energized thermionic discharge device having an output electrode coupled to the center tapped primary winding of one of said transformers of said pair of core transformers, a second normally de-energized thermionic discharge device having an output electrode coupled to the center tapped primary winding of the other of said transformers of said pair of core transformers, and means to actuate said control circuits to switch the polarity of a selected core.

5. In a magnetic matrix memory system, means for interrogating a selected core of a plurality of magnetic cores electrically arranged in a plurality of lines of rows and columns, said means comprising for each pair of rows and for each pair of columns a pair of thermionic discharge devices, said discharge devices of said pair each having at least a cathode, an anode, and a control grid, control circuits in circuit with said control grids, a center tapped linear transformer having one end of its primary winding coupled to the anode of one of said discharge devices of said pair and the other end of its primary winding coupled to the anode of the other said discharge device of said pair, a source of power coupled to said primary winding at its center tap, a pair of core transformers having a secondary winding and a center tapped primary winding, said primary windings being in parallel relationship with the secondary winding of said linear transformer, a connection from said secondary winding of one of said core transformers to all the cores of a line of the matrix of cores, a connection from said secondary winding of the other of said core transformers to all the cores of another line of the matrix of cores, a first normally de-energized thermionic discharge device having an output electrode coupled to the center tapped primary winding of one of said transformers of said pair of core transformers, a second normally de-energized thermionic discharge device having an output electrode coupled to the center tapped primary winding of the other of said transformers of said pair of core transformers, and an interrogation circuit having a conductor common to all of said cores in said matrix of cores, said conductor passing through all of said cores in series form, and means to actuate said control circuits to interrogate a selected core of the matrix of magnetic cores.

6. In a magnetic matrix system including a plurality of magnetic devices electrically arranged in columns and rows, switching means for actuating said devices comprising a pair of thermionic discharge devices for each pair of rows and a further pair of thermionic discharge devices for each pair of columns, said discharge devices each having at least a cathode, an anode, and a control grid, control circuits in circuit with said control grids, a center tapped linear transformer having one end of its primary winding coupled to the anode of one of said discharge devices and the other end of its primary winding coupled to the anode of the other said discharge device, a source of power coupled to said primary winding at its center tap, a pair of transformers for the magnetic devices having a secondary winding and a center tapped primary winding, said primary windings being in parallel relationship with the secondary winding of said linear transformer, a connection from said secondary winding of one of said magnetic devices transformers to all the magnetic devices of a line of the matrix of magnetic devices, a connection from said secondary winding of the other of said magnetic devices transformers to all the magnetic devices of another line of the matrix of magnetic devices, a first normally de-energized thermionic discharge device having an output electrode coupled to the center tapped primary winding of one of said transformers of said pair of magnetic devices transformers, a second normally de-energized thermionic discharge device having an output electrode coupled to the center tapped primary winding of the other said transformer of said pair of magnetic devices transformers, and means to energize said control circuits to actuate a selected magnetic device.

7. A magnetic memory comprising in combination a matrix of magnetic cores having a plurality of windings thereon and electrically arranged in rows and columns; a first group of transformers, a winding of the cores of the several individual rows of said core matrix being inductively coupled to individual transformers of said first group of transformers; a second group of transformers, a winding of the cores of the several columns of said core matrix being inductively coupled to individual transformers of said second group of transformers; linear transformers individually coupled to said first group and said second group of transformers, a source of power coupled to said linear transformers and means to change the state of a selected magnetic core of said matrix of magnetic cores through actuation of said power source.

References Cited in the file of this patent

UNITED STATES PATENTS

| | | |
|---|---|---|
| 2,691,154 | Rajchman | Oct. 5, 1954 |
| 2,734,184 | Rajchman | Feb. 7, 1956 |
| 2,740,949 | Counihan et al. | Apr. 3, 1956 |
| 2,776,419 | Rajchman et al. | Jan. 1, 1957 |

Disclaimer 2,932,011.—*Sidney N. Einhorn*, Philadelphia, and *George G. Hoberg*, Berwyn, Pa., *John O. Paivinen*, Menlo Park, Calif., and *Richard C. Weise*, Philadelphia, Pa. MATRIX SELECTION APPARATUS. Patent dated Apr. 5, 1960. Disclaimer filed Mar. 7, 1963, by the inventors and the assignee, *Burroughs Corporation*.

Hereby enter this disclaimer to claim 3 of said patent.

[*Official Gazette April 30, 1963.*]